Feb. 20, 1951     W. R. TALIAFERRO     2,542,845
CIRCUIT BREAKER CONTROL SYSTEM
Filed Jan. 29, 1948
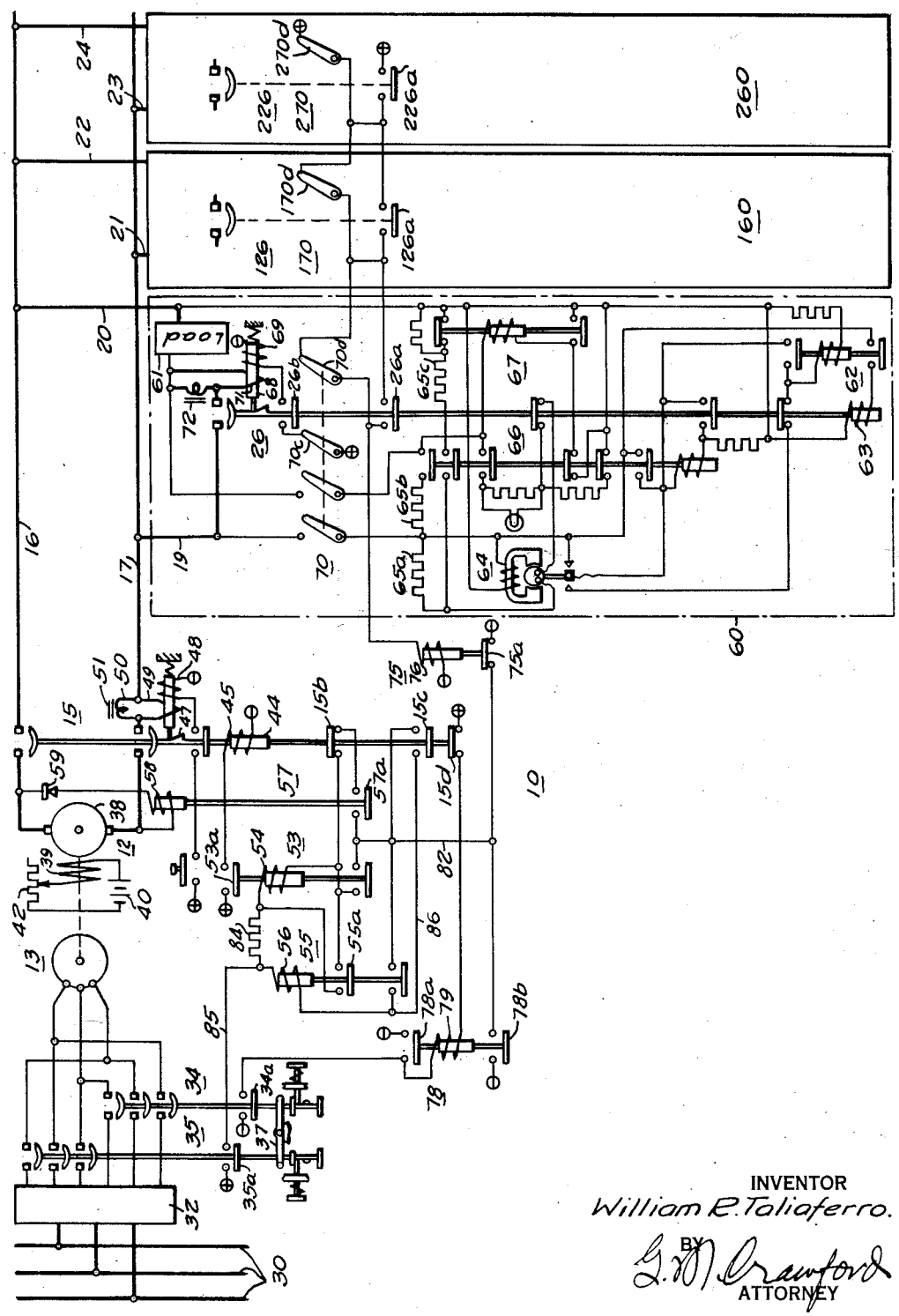
INVENTOR
William R. Taliaferro.
BY
G. M. Crawford
ATTORNEY Patented Feb. 20, 1951

2,542,845

UNITED STATES PATENT OFFICE 2,542,845

CIRCUIT BREAKER CONTROL SYSTEM

William R. Taliaferro, Pittsburgh, Pa., assignor to Westinghouse Electric Corporation, East Pittsburgh, Pa., a corporation of Pennsylvania Application January 29, 1948, Serial No. 4,999

9 Claims. (Cl. 171—97)

My invention relates, generally, to circuit breaker control systems, and it has reference, in particular, to automatic reclosing control systems for circuit breakers.

Generally stated, it is an object of my invention to provide an automatic reclosing control system for circuit breakers, which is simple and inexpensive to manufacture and which is reliable and effective in operation.

More specifically, it is an object of my invention to provide an automatic reclosing control system for selectively controlling reclosing of a bus circuit breaker dependent upon whether it opens in response to a bus fault or a feeder fault.

An important object of my invention is to provide for so controlling a high speed impulse responsive circuit breaker as to reclose it after opening in response to a feeder fault, and prevent it from reclosing after it opens in response to a bus fault.

Yet another important object of my invention is to provide for selectively reclosing a high speed impulse-tripped circuit breaker which cannot be calibrated so as to insure tripping only on a value of fault current higher than that which an associated feeder breaker may be set.

It is also an object of my invention to provide, in an automatic reclosing circuit breaker system, for using a control relay responsive to the opening of a feeder circuit breaker for selectively controlling the reclosing of a bus circuit breaker on a bus supplying electrical energy to the feeder.

Other objects, will in part be obvious and will, in part, be explained hereinafter.

In practicing my invention in one of its forms, high speed impulse-tripped circuit breakers are used on both the bus and feeders of a power system which is energized from a high voltage generator. The feeder breakers are reclosed automatically. A control relay which is deenergized whenever a feeder breaker trips sets up a reclosing circuit for the bus breaker. An auxiliary control relay responsive to starting of the motor driving the generator provides a closing circuit for the bus breaker when the motor is started, regardless of whether the feeder breakers have tripped or remain closed.

For a more complete understanding of the nature and scope of my invention, reference may be made to the following detailed description, which may be read in connection with the accompanying drawing in which the single figure is a diagrammatic view of a power system embodying the invention in one of its forms.

Referring to the drawing, the reference numeral 10 may denote, generally, a power system wherein a high voltage generator 12 driven by a motor 13 may be connected by means of a bus breaker 15 to bus conductors 16 and 17. Feeders 19—20, 21—22, and 23—24 may be connected to the bus conductors 16 and 17 for supplying electrical energy to different load circuits. Feeder breakers 26, 126 and 226 may be used in connection with the feeders 19—20, 21—22 and 23—24, respectively, for controlling the connections of associated load circuits thereto.

The motor 13 may be of any suitable type comprising, for example, a polyphase motor which may be connected to a source of alternating current represented by the conductors 30 through an auto transformer 32, and starting and running circuit breakers 34 and 35, which may be disposed to apply a reduced voltage and full running voltage to the motor 13, respectively. The circuit breakers 34 and 35 may be of any suitable type and for the purposes of simplification, are herein represented as manually operated circuit breakers which may be latched in the closed position and are provided with an interlock device 37 for preventing simultaneous operation.

The generator 12 may be of any suitable type comprising, for example, an armature 38 and a field winding 39. The field winding may be connected to any suitable source of excitation which may be represented by the battery 40, through a field rheostat 42.

The bus breaker 15 may be preferably of the high speed impulse-tripped type, so as to provide adequate protection for the generator 12. By utilizing a circuit breaker which trips in response to the rate of rise of the fault current, rather than in response to a predetermined value of fault current, the breaker may be tripped before the fault current reaches its maximum value, and hence flashing of the commutator of the generator may be prevented. The bus breaker 15 may, for example, comprise an armature 44 having an operating winding 45 for closing the breaker. Latch means 47 may be provided for retaining the breaker in the closed position. In order to provide for manually tripping the bus breaker 15, a shunt trip winding 48 may be provided in conjunction with the latch means 47 for releasing the armature 44 to permit the breaker to open.

For the purpose of tripping the bus breaker in response to the rate of rise of fault current, a series trip winding 49 connected in circuit relation between the generator 12 and the bus conductor 17 may be provided. An inductive shunt comprising a winding 50 having an iron core 51 with an air gap therein, may be connected in shunt circuit relation with the trip winding 49. This shunt provides a bypass for a current which has a relatively slow rate of increase, and yet presents a relatively high impedance to a fault current having a high rate of increase. Hence, the trip winding 49 may be made sensitive to the rate of increase of fault current, so as to trip the bus breaker almost as soon as the current starts to increase at a high rate, instead of waiting for the current to reach any predetermined maximum value.

Closing means may be provided for the bus breaker 15 comprising a closing relay 53 having an operating winding 54, and which is disposed to connect the operating winding 45 of the breaker to a source of electrical energy. A cutoff relay 55 having an operating winding 56 may be provided for effecting deenergization of the closing relay 53 when the bus breaker 15 is closed. A directional relay 57 having an operating winding 58 connected in circuit with a rectifier device 59, may be provided for preventing closing of the breaker 15 unless the polarity of the generator 12 is correct.

Each of the feeders may be provided with automatic reclosing control means for its associated feeder breaker, as represented by the dot and dash enclosures 60, 160 and 260, respectively. Since the reclosing control equipment for each of the feeder breakers may be substantially identical, only that for the breaker 26 connecting the load 61 to the feeder 19—20, has been shown in detail.

The reclosing control means for feeder breaker 26 may comprise a control system similar to that described in detail in the copending application, Serial No. 667,763 of George W. Pickels IV, which was filed on May 7, 1946. For example, the reclosing means may comprise a closing relay 62 for controlling energization of the operating winding 63 of the breaker 26. A sensitive control relay 64 of the D'Arsonval type may be provided for selectively controlling the energization of the closing relay, depending upon whether the effective impedance of the feeder circuit is such as to indicate that no more than normal current will flow if the feeder is connected to the source. For this purpose, the control relay 64 may be connected in a Wheatstone bridge circuit including the load 61 and resistors 65a, 65b and 65c, under the control of a setup relay 66 and a recalibrating relay 67 which is responsive to the existence of a voltage on the feeder from any other source, in the manner explained in detail in the copending Pickels application.

The feeder breaker 26 may be of any suitable type and may be provided with latch means 68 for retaining it in the closed position. A shunt trip winding 69 may be provided for operating the latch means to release the breaker in response to operation of a manual control switch 70. A series trip winding 71 may be provided in connection with the latch means 68 connected in circuit relation with the load and having an inductive shunt 72 associated therewith for providing an impulse tripping characteristic in the manner explained in connection with the bus breaker 15.

In order to provide for selectively reclosing the bus breaker 15 only whenever it trips in response to a feeder fault, means such as the control relay 75 having an operating winding 76 may be provided. The operating winding 76 may be connected to a suitable source of electrical energy through auxiliary contact members 26a, 126a and 226a, of the feeder breakers 26, 126 and 226, respectively. For the purpose of preventing deenergization of the control relay 75 whenever one of the feeder breakers is tripped manually, contact members 70d, 170d and 270d of the manual control switches 70, 170 and 270, may be utilized to provide shunt circuits about the contact members 26a, 126a and 226a respectively, whenever the feeder breakers are tripped manually by operation of the manual control switches. The control relay 75, which will thus be deenergized whenever a feeder breaker trips in response to a fault condition, may be utilized to set up a reclosing circuit by providing in its deenergized position an energizing circuit for the closing relay 53 of the bus breaker 15.

In order to provide for closing the bus breaker 15 whenever the generator 12 is initially started up, or when it is restarted after the bus breaker 15 has opened in response to a bus fault, an auxiliary control relay 78 having an operating winding 79 may be provided. The operating winding 79 may be connected for energization through a contact member 34a of the starting circuit breaker 34 so as to provide an energizing circuit for the closing relay 53, regardless of whether the control relay 75 may still remain in the energized position.

With the power system 10 in the deenergized condition, as shown, the motor 13 may be started by sequentially operating the starting circuit breaker 34 to apply a reduced voltage to the motor, and then closing the running circuit breaker 35. When the starting circuit breaker 34 is closed, an energizing circuit will be provided for the operating winding 79 of the auxiliary control relay 78, extending from negative through contact members 34a, operating winding 79, and contact member 15d to positive. The auxiliary control relay closes and provides a holding circuit for itself through contact members 78a.

If the voltage of the generator 12 is of the correct polarity, the directional relay 57 operates and an energizing circuit is provided for the operating winding 54 of the closing relay 53. This circuit extends from negative through contact members 78b, conductor 82, contact members 57a and 15b, operating winding 54, control resistor 84, and conductor 85 through contact members 35a of the running circuit breaker 35 to positive. The closing relay 53 operates and connects the operating winding 45 of the bus breaker for energization through contact member 53a.

As soon as the bus breaker 15 closes, an energizing circuit is provided for the operating winding 56 of the cutoff relay 55, extending from positive through contact members 35a, conductor 85, operating winding 56, conductor 86, contact members 15c, and conductor 82 to negative through either contact members 78b or contact members 75a. Operation of the cutoff relay 55 places a shunt around the operating winding 54 of the closing relay through contact members 55a, so that the closing relay returns to the deenergized position. The bus breaker 15 is latched in the closed position by the latch means 47.

As soon as voltage is applied to the bus conductors 16 and 17, the feeder breakers 26, 126 and 226 will close automatically, whenever the control switches 70, 170 and 270 thereof are thrown to the vertical or operating positions, to render the reclosing control means 60, 160 and 260 operative. Since operation of the reclosing circuit of the feeder breakers is substantially identical with that described in detail in the copending Pickels application hereinbefore referred to, it is not deemed necessary to provide a detailed description herein.

Should a fault occur on any one of the feeders, for example on the feeder 19—20, the breakers 26 and 15 will both be tripped, since in each instance the trip coils 71 and 49 are responsive to the rate of rise of fault current, and cannot be calibrated to operate on different maximum values of fault current.

With the feeder breakers 26, 126 and 226 closed, the control relay 75 will be energized through the circuit extending from negative through operating winding 76, contact members 26a, 126a and 226a to positive. When the feeder breaker 26 opens in response to a feeder fault, the energizing circuit for the control relay 75 is interrupted at contact members 26a. Accordingly, the control relay returns to the deenergized position.

A reclosing circuit is thus provided for the bus breaker 15 extending from negative through contact members 75a, conductor 82, contact members 57a and 15b, operating winding 54, control resistor 84, conductor 85, and contact members 35a to positive. The closing relay 53 operates and provides an obvious energizing circuit for the operating winding 45 of the bus breaker 15. When this circuit breaker closes, the cutoff relay 55 is energized so that it shunts down the closing relay 53. As soon as the bus breaker 15 closes and voltage is applied to the bus conductors 16 and 17, the feeder circuit breaker 26 will automatically reclose, if the reclosing control means 60 indicates that the fault has been removed.

Should a fault occur on the bus conductors 16 and 17, the bus breaker 15 will be tripped, while the feeder breakers remain in the closed position. Accordingly, the control relay 75 remains in the energized position. Since the auxiliary control relay 78 includes in its energizing circuit contact members 15d of the bus breaker 15, as well as contact members 34a of the starting circuit breaker, the auxiliary control relay will return to the deenergized position as soon as the bus breaker 15 closes. Accordingly, when the bus breaker 15 is tripped while the motor 13 is still running and the feeder breakers remain closed, no energizing circuit is provided for the operating winding 54 of the closing relay 53. Thus the bus breaker 15 will not reclose automatically after it is opened in response to a bus fault.

In order to provide for closing the bus breaker 15 after it has opened in response to a bus fault, the motor 13 must be shut down and restarted by the operator. When the starting switch 34 is closed, an energizing circuit will be provided for the operating winding 79 of the auxiliary control relay 78, extending through contact members 34a, operating winding 79, and contact members 15d. The auxiliary control relay operates and provides a holding circuit for itself through contact member 78a.

When the voltage of the generator 12 reaches a suitable value, and is of the correct polarity, the directional relay 57 operates and completes an energizing circuit for the closing relay 53, extending from positive through contact members 35a, conductor 85, resistor 84, operating winding 54, contact members 15b and 57a, conductor 82, and contact members 78b to negative. The closing relay 53 operates, connecting the operating winding of the bus breaker 15 to the source through contact member 53a. The bus breaker thereupon closes deenergizing the operating winding 79 of the auxiliary control relay 78 by opening contact member 15d and energizing the cutoff relay 55 through contact member 15c. The cutoff relay 55 thereupon shunts down the closing relay 53.

Should the feeder breaker 26 be tripped manually by the operator moving the control switch 70 to the right-hand or "trip" position, the shunt trip winding 69 will be energized through contact member 26b and contact member 70c. When the feeder breaker 26 opens, contact member 26a also opens. However, since the control switch 70 has been manually operated to trip the feeder breaker, contact member 70d is connected in shunt circuit relation with contact member 26a so that an alternate energizing circuit is provided for maintaining the control relay 75 in the energized position. Accordingly, should a bus fault occur, which would cause the bus breaker 15 to open, the control relay 75 will remain in the energized position, and hence will not provide a reclosing circuit for the bus breaker.

From the above description and the accompanying drawing, it will be apparent that I have provided in a simple and effective manner for selectively controlling the reclosing of a bus breaker in response to feeder and bus fault conditions. A control system embodying the features of my invention is of particular value when the bus and feeder breakers are to be used in connection with a high voltage generator on the order of, for example, 1000 volts or more. Since it is essential with high voltage generators to use high speed protection so as to prevent flashing the commutator, it is not possible to obtain selective trippings of the bus and feeder breakers in the usual manner by calibrating them to trip on different values of fault currents. Accordingly, I have, by my invention, provided for utilizing high speed, impulse-tripped circuit breakers which afford the maximum protection to the high voltage generator and have, at the same time provided the maximum continuity of service by selectively effecting reclosure of the bus breaker whenever it is tripped in response to a feeder fault, and preventing reclosing of the bus breaker when it trips in response to a bus fault.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. A control system for impulse-tripped circuit breakers for a bus and a feeder said breakers each having impulse tripping means responsive only to the rate of rise of a fault current energized independently from said bus and feeder, respectively, comprising, reclosing means for the bus breaker, reclosing means for the feeder breaker operable independently of the bus breaker reclosing means, and relay means operable in response to opening of the feeder breaker upon the occurrence of a fault on the feeder to connect the bus breaker reclosing means to reclose the bus breaker.

2. In a power system having a bus and feeder energized from a high voltage dynamo electric machine, impulse-tripped circuit breakers connecting the bus to the machine and the feeder to the bus, said breakers each having trip means independently responsive only to the rate of rise of fault currents in the bus and feeder, respectively, automatic reclosing means for reclosing the feeder breaker in response to predetermined voltage conditions of the bus and impedance conditions of the feeder, control means operable to reclose the bus breaker, and circuit means including a control relay responsive to tripping of the feeder breaker connecting the control means to reclose the bus breaker.

3. In a control system for high speed impulse-tripped circuit breakers connecting a bus to a source and a feeder to the bus, reclosing means for the feeder breaker, additional reclosing means for the bus breaker, circuit means including a control relay normally responsive to opening of the feeder breaker to effect operation of the additional reclosing means, and additional circuit means including contact means responsive to opening of the feeder breaker by an operator operable to prevent operation of said additional reclosing means.

4. A control system for a bus breaker having trip means responsive only to the rate of rise of a fault current and disposed to be energized from the bus and a plurality of feeder breakers each having trip means responsive only to the rate of rise of a fault current and disposed to be independently energized from their respective feeders comprising, reclosing means for each feeder breaker responsive to the bus voltage, a control relay responsive to fault tripping of any one of the feeder breakers, and reclosing means for the bus breaker controlled by the controlled relay.

5. In a control system for a dynamo electric machine having a bus breaker and a plurality of feeder breakers with reclosing means, closing means for the bus breaker, control means responsive to fault tripping of a feeder breaker for rendering the closing means of the bus breaker operable, and additional control means responsive to starting of the dynamo electric machine for effecting operation of said closing means.

6. In a control system for a power system having a high voltage bus supplied with electrical energy from a motor generator set and a plurality of feeders, a bus circuit breaker connecting the bus to the generator, a feeder circuit breaker connecting each of the feeders to the bus, trip means for the feeder and bus breakers responsive to the rate of increase of current in the feeders and bus, respectively, for tripping the breakers before the maximum fault current is reached, reclosing means responsive to predetermined voltage conditions of the bus for reclosing the feeder breakers, closing means for the bus breaker, a control relay, circuit means connecting the control relay for operation to prevent operation of the closing means of the bus breaker unless one of the feeder breakers trips, and an auxiliary control relay connected so as to be operable in response to starting of the motor to render the control relay ineffective to prevent operation of the closing means of the bus breaker.

7. A control system for bus and feeder breakers respectively connecting a bus to a high voltage generator and a feeder to the bus comprising, reclosing means operable to reclose the feeder breakers in accordance with predetermined voltage conditions of the bus, closing means for the bus breaker, control means operable to prevent operation of said closing means, and circuit means connected to effect operation of the control means including contact means responsive to closing of a feeder breaker and additional contact means responsive to manual tripping of a feeder breaker.

8. A control system for high speed bus and feeder circuit breakers having impulse-responsive trip means comprising, automatic reclosing means responsive to the voltage of the bus and the impedance of the feeder for reclosing a feeder breaker, closing means for the bus breaker, relay means having normally closed contact means in circuit relation with the closing means, circuit means including contact members responsive to operation of a feeder breaker connected to provide an operating circuit for the relay means, and additional circuit means including contact means operable when a feeder breaker is opened by an operator connected in shunt relation with the aforesaid circuit means.

9. A control system for a bus and feeder system comprising, an impulse-tripped bus breaker connecting the bus to a motor generator set having starting means, impulse-tripped circuit breakers connecting the feeders to the bus, reclosing means for each feeder breaker operable in response to predetermined voltage conditions of the bus and impedance conditions of the feeder when the associated feeder breaker opens, closing means for the bus breaker, circuit means providing an energizing circuit for the closing means including a control relay, contact means responsive to opening of a feeder breaker to interrupt the energizing circuit of the control relay, additional contact means responsive to manual tripping of a feeder breaker connected in shunt circuit relation with each of the aforesaid contact means, control means operable to start the motor generator set, and circuit means including an auxiliary control relay responsive to predetermined operation of the starting means connected to render the control relay ineffective to prevent operation of the closing means.

WILLIAM R. TALIAFERRO.

REFERENCES CITED

The following references are of record in the file of this patent:

UNITED STATES PATENTS

| Number | Name | Date |
| --- | --- | --- |
| 1,184,845 | Fortescue | May 30, 1916 |
| 1,698,292 | Bany | Jan. 8, 1929 |
| 1,893,348 | Anderson | Jan. 3, 1933 |
| 2,100,215 | Henniger | Nov. 23, 1937 |
| 2,292,860 | Anderson | Aug. 11, 1942 |